(12) United States Patent
Ellion (10) Patent No.: US 7,290,684 B1
(45) Date of Patent: Nov. 6, 2007

(54) LIQUID DISPENSER INCLUDING REGULATOR DEVICE

(76) Inventor: M. Edmund Ellion, 3660 Woodstock Rd., Santa Ynez, CA (US) 93460

( * ) Notice: Subject to any disclaimer, the term of this patent is extended or adjusted under 35 U.S.C. 154(b) by 0 days.

(21) Appl. No.: 11/680,726

(22) Filed: Mar. 1, 2007

Related U.S. Application Data (60) Provisional application No. 60/744,404, filed on Apr. 6, 2006.

(51) Int. Cl.
*G01F 11/28* (2006.01)
(52) U.S. Cl. .................. 222/442; 222/454; 222/456
(58) Field of Classification Search ............... 222/442, 222/456, 454
See application file for complete search history.

(56) References Cited

U.S. PATENT DOCUMENTS 5,078,305 A * 1/1992 Glynn et al. ............... 222/442

FOREIGN PATENT DOCUMENTS

FR 2601652 A1 * 1/1988

* cited by examiner

*Primary Examiner*—Philippe Derakshani
(74) *Attorney, Agent, or Firm*—Hugh P. Gortler (57) ABSTRACT

A fluid dispenser has a fluid outlet and an ambient inlet. The dispenser includes a container having a cavity, and a regulator device within the container cavity for regulating liquid flow out of the fluid outlet. The regulator device has a cavity in fluid communication with the ambient inlet, and an air transfer orifice for placing the device cavity in fluid communication with the container cavity. The air transfer orifice is spaced apart from the ambient inlet. The regulator device also has a fluid inlet. Location of the air transfer orifice with respect to the fluid inlet is such that flow of liquid from the container cavity into the device cavity stops when the liquid in the device cavity reaches the air transfer orifice.

14 Claims, 6 Drawing Sheets

LIQUID DISPENSER INCLUDING REGULATOR DEVICE

BACKGROUND

Figures 1A, 1B, 1C, 2:
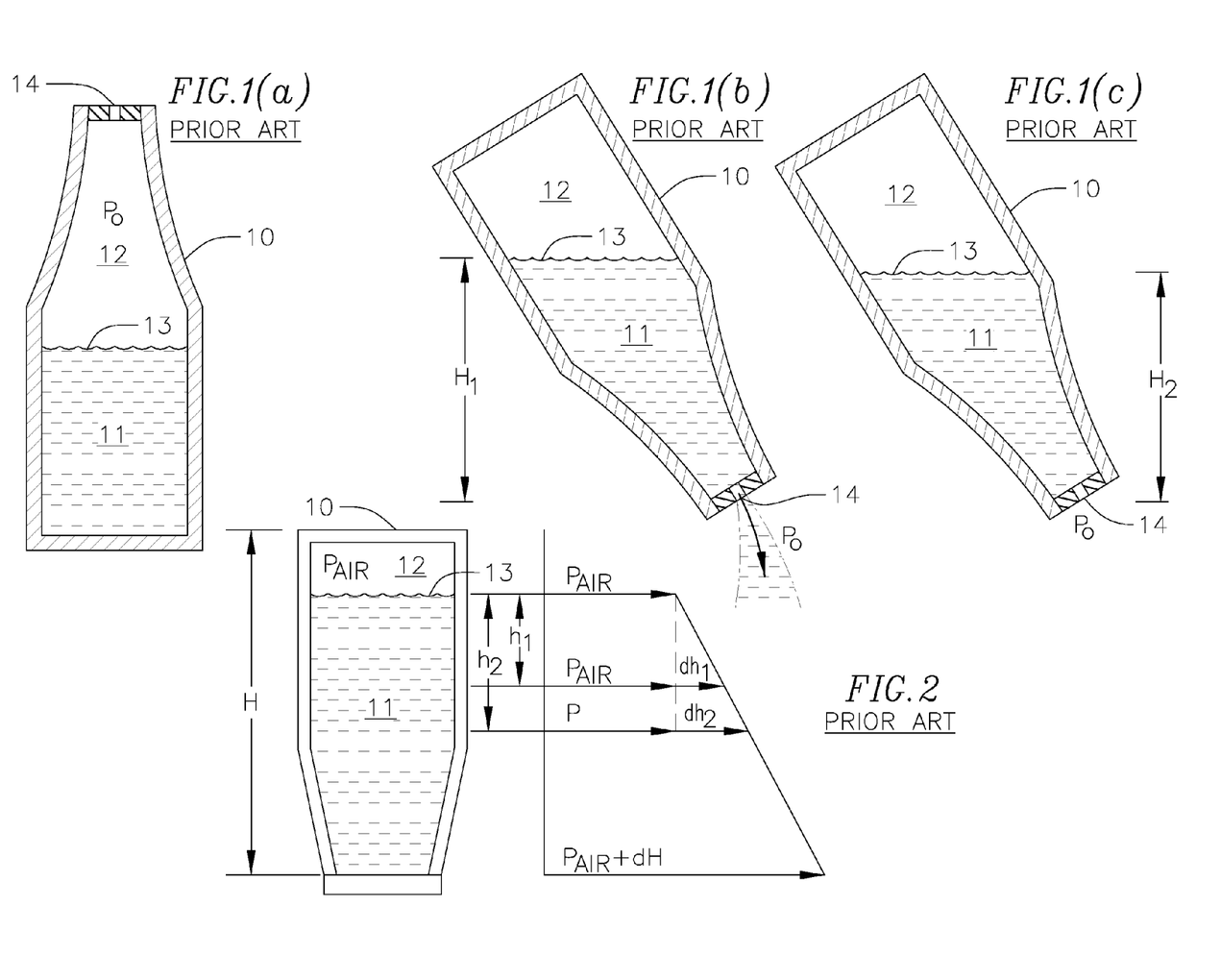
FIGS. 1a, 1b and 1c are illustrations of a conventional closed container with a small discharge orifice.
FIG. 2 is an illustration of pressure in liquid in the container of FIGS. 1a, 1b and 1c.

FIG. 1a illustrates a closed container 10 with a small discharge orifice 14 containing liquid 11. The pressure of the air 12 in the container 10 is equal to atmospheric pressure $P_o$. The pressure in the liquid 11 at any depth increases from the value of the air pressure at the surface level 13 of the liquid 11 by an amount equal to the density of the liquid times the vertical distance below the surface 13 of the liquid 11. This pressure distribution is illustrated in FIG. 2 for the container 10 when the container 10 is inverted and the orifice 14 is blocked. If the container 10 is inverted and if the liquid 11 is water, an orifice diameter of less than 0.2 inches will prevent atmospheric air from entering the container 10 through the orifice 14. Since the pressure of the liquid 11 increases by an amount equal to the density (d) of the liquid 11 times the depth below the surface 13, it should be noted that the difference in the liquid pressure from the depth $h_1$ to the depth $h_2$ is equal to the product of the density times the vertical distance between $h_1$ and $h_2$ and is independent of the pressure of the air (Pair) or the amount of liquid 11 in the container 10.

FIG. 1b illustrates the container 10 when it is inverted and the small discharge orifice 14 is located a vertical distance $H_1$ below the surface 13 of the liquid 11. Since the air pressure in the container 10 is at atmospheric $P_o$, the pressure of the liquid at the discharge orifice 14 is greater than the atmospheric pressure by the product of the liquid density (d) times the vertical distance ($H_1$) below the surface 13 of the liquid. That is, $P=P_o+dH_1$, where P is the pressure on the container-side of the discharge orifice 14. This added pressure causes liquid 11 to flow out of the container 10 to the atmosphere through the discharge orifice 14. As liquid 11 flows out of the container 10, the volume of the air 12 in the container 10 increases causing the pressure of the air 12 within the container 10 to decrease. The flow of liquid 11 through the discharge orifice 14 continues until the pressure (Pair) of the air 12 in the container 10 decreases to a value equal to the atmospheric pressure $P_o$ minus the product of the density of the liquid times the vertical distance the discharge orifice 14 is below the surface 13 of the liquid 11. When the pressure of the liquid at the container side of the discharge orifice 14 equals the atmospheric pressure $P_o$, the flow of liquid stops as illustrated in FIG. 1c. It should be noted that the volume of the liquid 11 flowing out of the container is not constant since it depends on the level of the liquid 11 in the container 10 as well as the volume of the air 12 in the container 10.

Figures 3A, 3B, 3C:
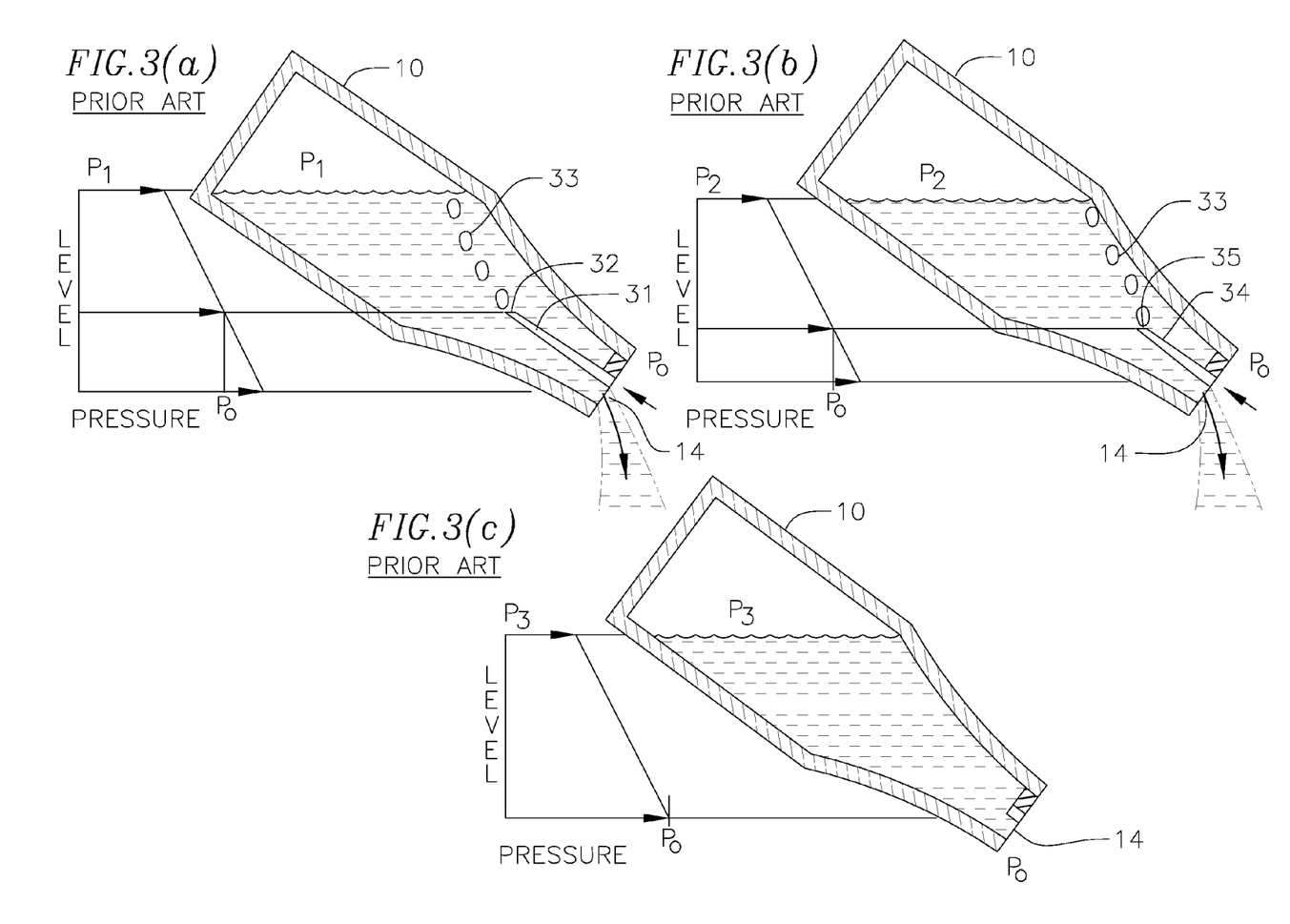
FIGS. 3a, 3b, and 3c are illustrations of conventional closed containers with vent tubes of different lengths.

FIGS. 3a, 3b and 3c illustrate three containers 10 having vent tubes of three distinct lengths. Each container 10 also has a small discharge orifice 14. FIG. 3a illustrates a container 10 with a vent tube 31 that is in fluid communication with the atmosphere and the interior of the container 10. FIG. 3a also illustrates the container 10 in an inverted orientation. When liquid is discharged through the discharge orifice 14, the pressure in the container 10 tends to decrease. When the pressure of the liquid at the exit 32 of the vent tube 31 decreases to slightly below atmospheric, air 33 from the atmosphere enters the container 10 through the vent tube 31. This air 33 replaces the liquid that is discharged and the pressure of the liquid in the container remains constant thereafter. The result is that the pressure at the discharge orifice 14 is maintained above atmospheric since it is below the level of exit 32 and the liquid continues to be discharged. This discharge would occur until the container 10 is empty of liquid.

FIG. 3b illustrates a container 10 with a shorter vent tube 34. In this container 10, the pressure must decrease to atmospheric at the exit 35 of the vent tube 34 before air can enter the container 10 and maintain the pressure of the liquid constant. Since the vent tube 34 is shorter, there is less liquid between the exit 35 of the vent tube 34 and the discharge orifice 14. As a result the pressure at the discharge orifice 14 is lower than it was with the longer vent tube 31 and the discharge rate of liquid is lower. However, the discharge of liquid will still continue until the container 10 is empty of liquid.

FIG. 3c illustrates a container 10 with a zero length vent tube (just an orifice 14). In this case the liquid is discharged until the liquid pressure at the orifice 14 decreases to atmospheric. Only a small percent of the liquid contents of the container 10 is discharged.

It would be desirable for a liquid dispenser to have a vent tube that can change its length automatically to decrease the discharge flow rate so that the tube length becomes zero when a desired volume of liquid is discharged and the flow stops.

It would also be desirable to realize this effect without any moving parts.

In certain situations, it would also be desirable to dispense a measured volume of liquid.

BRIEF DESCRIPTION OF THE DRAWINGS

FIGS. 5a-5d illustrate the operation of a regulator device in accordance with an embodiment of the present invention.

FIGS. 6a-6d are illustrations of functional equivalents of the device of FIGS. 5a-5d.

FIGS. 7a-7d illustrate the principles of operation of liquid dispensers illustrated in FIGS. 8a-8d, 9 and 10.

FIGS. 8a-8d are illustrations of a liquid dispenser according to an embodiment of the present invention.

DETAILED DESCRIPTION

Figure 4A:
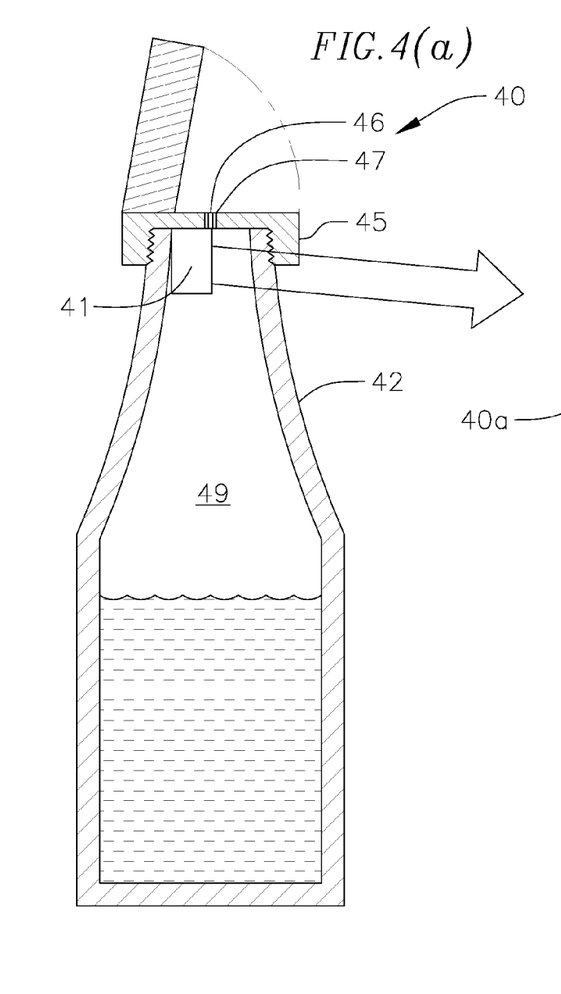
FIG. 4a is an illustration of a liquid dispenser according to an embodiment of the present invention.
Figures 4B, 4C:
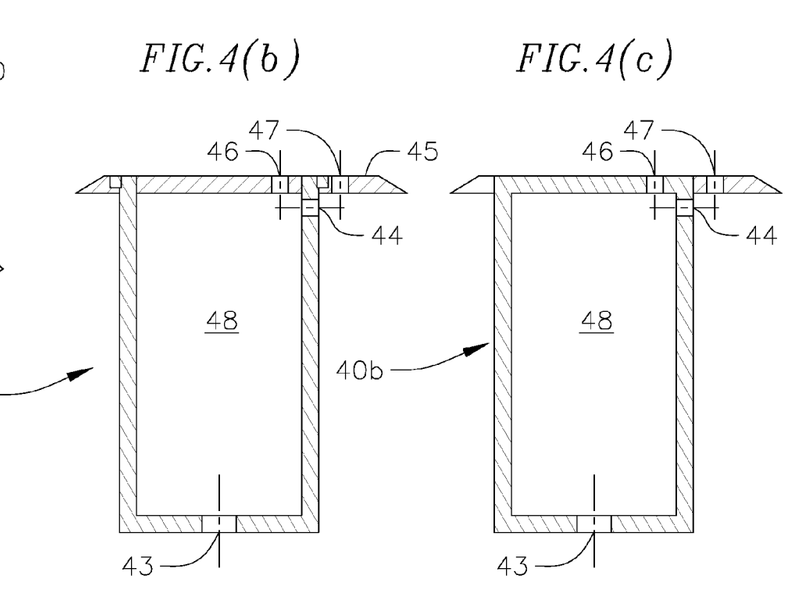
FIGS. 4b and 4c are illustrations of a regulator device in accordance with embodiments of the present invention.

Reference is made to FIG. 4a, which illustrates a liquid dispenser 40 in an upright position. The liquid dispenser 40 includes a container 42 having a cavity 49, a closure 45 for the container 42, and a regulator device 41 within the container cavity 49. In a first embodiment of the liquid dispenser 40a, as shown in FIG. 4b, the closure 45 has an air inlet orifice 46 and a liquid discharge orifice 47. In a second embodiment of the liquid dispenser 40b, as shown in FIG. 4c, the regulator device 41 has the air inlet orifice 46 instead of the closure 45. In both embodiments, the regulator device 41 has a cavity 48, an air transfer orifice 43 and a device liquid inlet orifice 44.

When the liquid dispenser 40 is oriented in an upright position, as shown in FIG. 4a, any liquid in the device cavity 48 drains back into the container cavity 49 through the air transfer orifice 43. The air inlet orifice 46 admits atmospheric air into the device cavity 48. The air transfer orifice 43 admits air into the container cavity 49 from the device cavity 48. The pressures in the upright liquid dispenser 40 are as follows:

Air in the device cavity 48=Atmosphere ($P_o$).
Air at the air transfer orifice 43=Atmosphere ($P_o$).
Liquid at the air transfer orifice 43=Atmosphere ($P_o$).
Liquid at the device liquid inlet orifice 44 and the liquid discharge orifice 47 equal atmosphere plus the liquid density times the liquid level between the air transfer orifice 43 and the liquid discharge orifice 47 ($P_o+dh_1$).
Air at the air inlet orifice 46=Atmosphere ($P_o$).

It will be instructive to describe a simplified configuration before describing the actual design. The simplification is based on the following assumptions: (1) zero pressure drop across any of the four orifices, (2) the device 41 is inverted from upright, (3) the vertical height of liquid between the air inlet orifice 46 and the liquid discharge orifice 47 is negligible and (4) the liquid pressure at the air transfer orifice 43 has decreased to atmospheric at the start of this discussion.

Figure 5A:
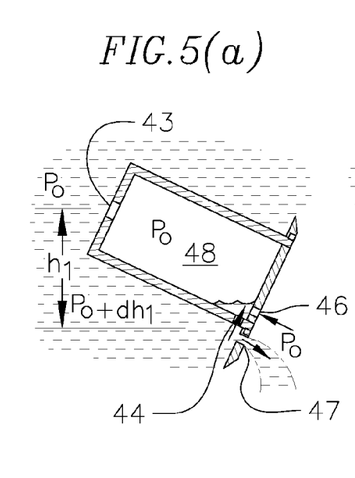

When the container 42 is inverted, sufficient liquid has been withdrawn from the container 42 to reduce the pressure of the liquid at the air transfer orifice 43 to atmospheric $P_o$ as illustrated in FIG. 5a.

FIG. 5a illustrates the regulator device 41 inverted from the upright orientation. At this orientation, it the regulator device 41 is immersed in liquid from the container 42.

As soon as the liquid dispenser 40 is inverted and the regulator device 41 becomes immersed in liquid, the pressure at the air transfer orifice 43 is greater than atmospheric. Consequently, fluid flows into the device cavity 48 through the air transfer orifice 43 until the pressure at the air transfer orifice 43 decreases below that in the device cavity 48.

Figure 5B:
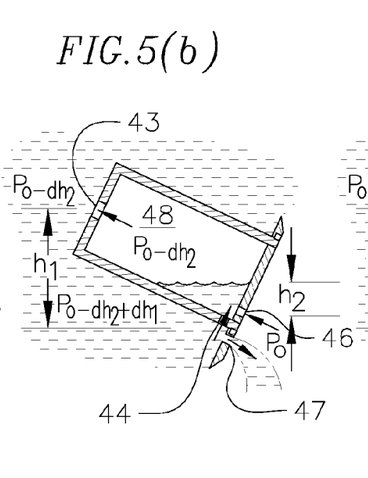

The head of liquid in the container cavity 49 between the air transfer orifice 43 and the device liquid inlet orifice 44 causes the pressure of the liquid at the device liquid inlet orifice 44 and the liquid discharge orifice 47 to be greater than atmospheric. As a result liquid is discharged through the liquid discharge orifice 47 and liquid flows into the device cavity 48 through the liquid inlet orifice 44 as illustrated in FIG. 5b. The pressure in the device cavity 48 reduces to the value of atmospheric minus the liquid head in the device cavity 48 ($P_o-dh_2$). As liquid is discharged, the pressure of the liquid in the container 42 at the air transfer orifice 43 is reduced, causing a reduction in the discharge rate. This reduction of pressure also causes air in the cavity 48 to flow into the container 42 through the air transfer orifice 43 to maintain the pressure therein and the discharge continues.

Figure 5C:
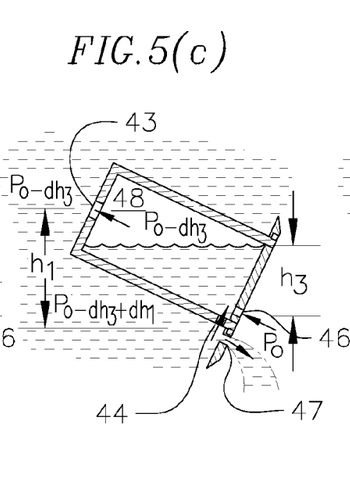
Figure 5D:
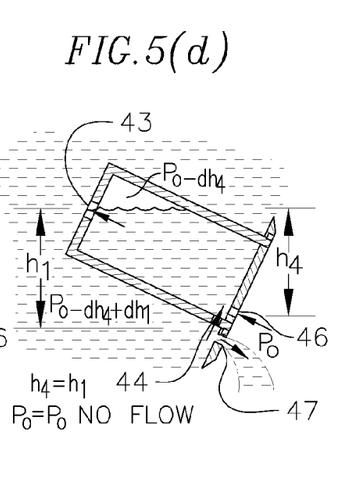

Liquid continues to flow into the device cavity 48 through the device liquid inlet orifice 44, and liquid continues to be discharged through the liquid discharge orifice 47 until the device cavity 48 becomes full of liquid as illustrated in FIG. 5d. At that time, the pressure at the air transfer orifice 43 equals $P_o-dh_4$ and the pressure at the liquid discharge orifice 47 equals $P_o-dh_4+dh_1$. Since $dh_1=dh_4$, the pressure at the device liquid inlet orifice 44 and the liquid discharge orifice 47 equal atmospheric $P_o$, so all flow out of orifice 47 stops. It should be noticed that the pressure at the liquid discharge orifice 47 depends only on the pressure at the air transfer orifice 43 and the vertical distance between the air transfer orifice 43 and the liquid discharge orifice 47. The volume of the discharged liquid is controlled by the size of the liquid inlet orifice 44, the pressure at the liquid discharge orifice 47 and the time it takes to fill the device cavity 48 with liquid. The discharge is seen to be independent of the amount of air and liquid in the container 42.

A fixed volume is discharged through the liquid discharge orifice 47 because of the following conditions:

(1) The rate of flow of the discharged liquid is controlled by the size of the liquid discharge orifice 47 and the pressure difference between the liquid at the liquid discharge orifice 47 and the atmosphere.
(2) The pressure at the liquid discharge orifice 47 is controlled by the pressure at the air transfer orifice 43 and the height of the liquid between the two orifices 43 and 47.
(3) The pressure at the air transfer orifice 43 is controlled by the pressure in the device cavity 48.
(4) The pressure within the device cavity 48 is controlled by the liquid level in the device cavity 48.
(5) The liquid level in the device cavity 48 is controlled by the size of the device liquid inlet orifice 44 and the volume of the device cavity 48.

Figures 6A, 6B, 6C:
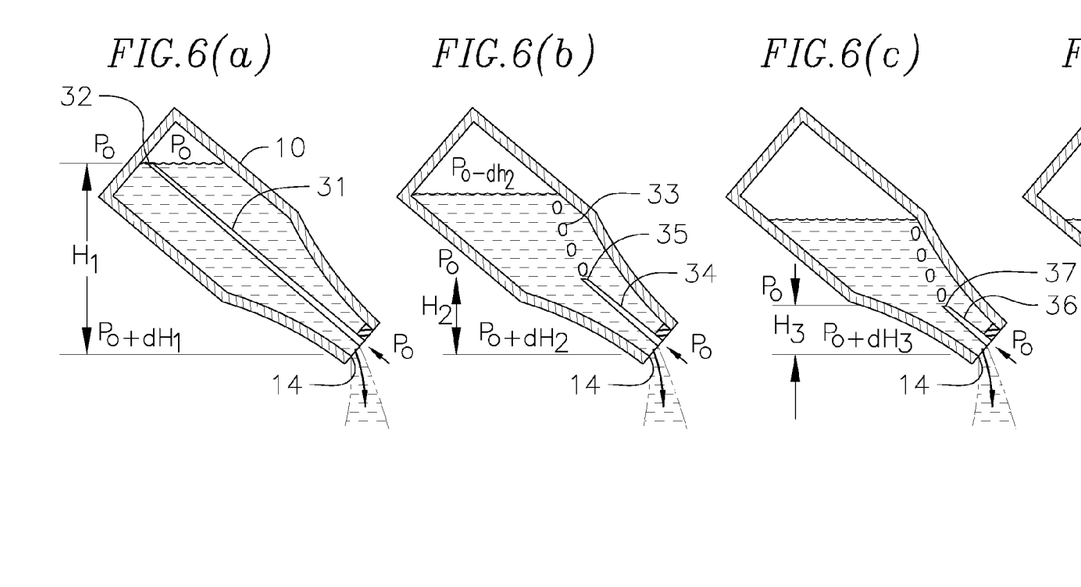

Thus, the regulator device 41 is functionally equivalent to a variable length vent tube. This becomes apparent from a comparison of the device in FIGS. 5a-5d to its functional equivalents in FIGS. 6a-6d. The small pressure drop through the orifice will be neglected in this comparison.

Reference is once again made to FIG. 5a. Sufficient liquid has been discharged from the container 42 so that the liquid at the air transfer orifice 43 is at the pressure of the atmosphere. Since the air in the cavity 48 is at atmospheric, there is no pressure difference, so air in the cavity 48 does not flow through the air transfer orifice 43 or the air inlet orifice 46. The pressures at the device liquid inlet orifice 44 and the liquid discharge orifice 47 are greater than at the air transfer orifice 43 and therefore greater than atmospheric due to the head of liquid ($h_1$). As a result, liquid flows into the device cavity 48 through the liquid inlet orifice 44, and it flows out of the container 42 through the liquid discharge orifice 47.

The pressure of the liquid at the air transfer orifice 43 equals $P=P_o$ and the pressure at the liquid discharge orifice 47 equals $$P=P_o+dh_1 \qquad (1)$$

where $P_o$ is the atmospheric pressure, d is the density of the liquid, and $h_1$ is the height of the liquid between the air transfer orifice 43 and the liquid discharge orifice 47.

The functional equivalent of FIG. 5a is illustrated in FIG. 6a. FIG. 6a illustrates a container 10 with a long vent tube 31. The pressure of the liquid at the exit 32 to the vent tube 31 equals $P_o$ and the pressure at the discharge orifice 14 equals $$P=P_o+dH_1. \qquad (2)$$

where $P_o$ is the atmospheric pressure, d is the density of the liquid, and $H_1$ is the vertical height of the liquid between the vent tube exit 32 and the discharge orifice 14.

It is seen by comparing equation 1 with equation 2 that the pressure at the liquid discharge orifice 47 and discharge orifice 14 are the same if $h_1=H_1$. As a result the discharge rate will be the same if the size of the liquid discharge orifice 47 also equals the size of the discharge orifice 14.

FIG. 5b illustrates the regulator device 41 after additional liquid has flowed into the device cavity 48. FIG. 6b illustrates the functional equivalent, which has a shorter vent tube 34 than the vent tube of FIG. 6a. The pressure of the air in the device cavity 48 equals $P_o - dh_2$ the pressure of the liquid at the air transfer orifice 43 equals $P_o - dh_2$ and the pressure at the liquid discharge orifice 47 equals $P_o - dh_2 + dh_1$.

Reference is made to FIG. 5c, which illustrates the regulator device 41 after more liquid has flowed into the device cavity 48. The pressure of the air in the device cavity 48 equals $P_o - dh_3$, the pressure of the liquid at the air transfer orifice 43 equals $P = P_o - dh_3$ and the pressure at the liquid discharge orifice 47 equals $$P = P_o - dh_3 + dh_1 \tag{3}$$

where $P_o$ is the atmospheric pressure, d is the density of the liquid, $h_1$ is the vertical height between the air transfer orifice 43 and the liquid discharge orifice 47, and $h_3$ is the vertical height of the liquid in the device cavity 48.

The functional equivalent of FIG. 5c is illustrated in FIG. 6c. FIG. 6c illustrates a container 10 with a shorter vent tube 36 than the vent tube 31 in FIG. 6a. Sufficient liquid has been removed from the container 10 so that the pressure of the liquid at the exit 37 to the vent tube 36 equals $P_o$ and the pressure at the discharge orifice 14 equals $$P = P_o + dH_3 \tag{4}$$

where $P_o$ is the atmospheric pressure, d is the density of the liquid, $H_3$ is the height of the liquid between the vent tube exit 37 and the discharge orifice 14.

Equation (4) becomes $$P = P_o - d\Delta h + dH_1 \tag{5}$$

where $\Delta h$ is the difference in the vertical length of the long and short vent tubes. That is, $\Delta h = H_1 - H_3$.

Examination of equation (3) and (5) shows that the pressures at the discharge orifices have similar relations. As a result the flow rate discharges are equal if $\Delta h = h_3$, if $H_1 = h_1$, and if the discharge orifices 47 and 14 are of equal size.

Reference is made to FIG. 5d, which illustrates the regulator device 41 when the device cavity 48 is full of liquid. The pressure of the liquid at the air transfer orifice 43 equals $P = P_o - dh_4$ and the pressure at the liquid discharge orifice 47 equals $$P = P_o - dh_4 + dh_1 \tag{6}$$

where $P_o$ is the atmospheric pressure, d is the density of the liquid, $h_1$ is the height of the liquid between the air transfer orifice 43 and the liquid discharge orifice 47, and h4 is the height of the liquid in the device cavity 48.

Since the device cavity 48 is full of liquid, ($h_4 = h_1$) and equation (6) becomes $$P = P_o. \tag{7}$$

Figure 6D:
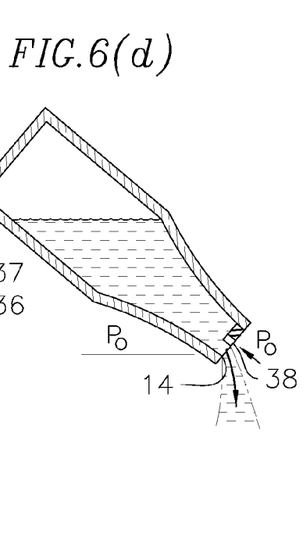

The functional equivalent of FIG. 5d is illustrated in FIG. 6d. FIG. 6d illustrates a container with a vent tube of zero length 34 (just an orifice). Sufficient liquid has been removed from the container so that the pressure of the liquid at the orifice 14 equals $$P = P_o \tag{8}$$

where $P_o$ is the atmospheric pressure.

It is seen by equations (7) and (8) that the pressures at the discharge orifices 47 and 14 are equivalent. If the size of the discharge orifices 47 and 14 are also equal, the liquid discharge flow rates are also equal.

Thus, the regulator device 41 effectively operates as a variable length vent tube. The level of the liquid in the device cavity 48 below the orifice 43 produces the same effect on the liquid discharge rate as vent tubes of different lengths. Yet the vent device 41 effectively operates in such a manner without any moving parts.

The device 41 also functions to dispense liquid over a constant interval of time. The rate of liquid discharged from the container through the liquid discharge orifice 47 is controlled by the liquid pressure at the liquid discharge orifice 47 and the size of the liquid discharge orifice 47. The pressure at the liquid discharge orifice 47 is controlled by the size of the device cavity 48, the rate at which atmospheric air is admitted to the device cavity 48 through the air inlet orifice 46 and then to the container 42 through the air transfer orifice 43. The rate at which atmospheric air is admitted to the device cavity 48 is controlled by the size of the air inlet orifice 46 and the pressure in the device cavity 48. The pressure in the device cavity 48 is controlled by the rate at which liquid is admitted to the device cavity 48 through the device liquid inlet orifice 44.

When the container 42 is inverted, liquid is discharged from the container 42 through the liquid discharge orifice 47 and other liquid enters the device cavity 48 through the device liquid inlet orifice. As a result, the pressures in the container 42 and the device cavity 48 are reduced. This reduction allows air from the atmosphere to flow into the device cavity 48 through the air inlet orifice 46 and then into the container 42 through the air transfer orifice 43. This airflow keeps the pressure at the fluid discharge orifice above atmospheric and liquid continues to be discharged. Simultaneously, liquid from the container 42 continues to flow into the device cavity 48 through the device liquid inlet orifice 44. The resulting head of liquid in the device cavity 48 restricts the rate at which air enters the device cavity 48. Thus, the pressure in the device cavity 48 and the container 42 is reduced. Because of the lower pressure, the discharge rate of liquid is reduced. When the head of liquid in the device cavity 48 is great enough to stop the flow of air into the device cavity 48 and then into the container 42, the pressure at the liquid discharge orifice reduces to atmospheric and the discharge stops. This occurs when liquid reaches the air transfer orifice 43. The volume of the discharge is controlled by the liquid pressures at the liquid discharge orifice 47, the size of the liquid discharge orifice 47 and the time that it takes for the device cavity 48 to fill with liquid.

In order to increase the discharge volume, the device liquid inlet orifice 44 could be decreased to increase the time to fill the regulator device 41 or the volume of the regulator device 41 could be increased. Another way to increase the volume of the discharge is to increase the rate of discharge by increasing the liquid discharge orifice 47.

The volume of the dispensed liquid varies by about ±3% as determined by experiment. This variation should be sufficient for certain applications, such as coffee cream dispensers, liquor dispensers, adding concentrated liquids to dilatants, etc.

The regulator device of FIG. 4a regulates the time during which liquid flows out of the liquid dispenser 40. However, a regulator device according to the present invention is not so limited. FIGS. 8-10 illustrate regulator devices that regulate the volume of captured liquid, which is then dispensed through a fluid outlet. Before describing the embodiments in FIGS. 8-10, their principle of operation will be described. The principle of operation will be described in connection with FIGS. 7a-7d.

Figure 7A:
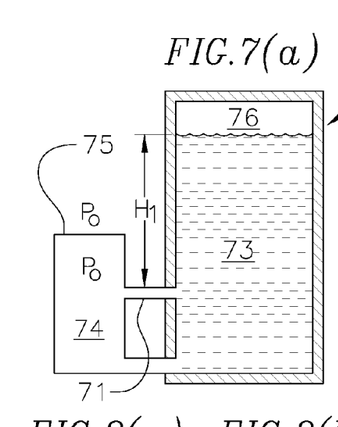

Reference is now made to FIG. 7a, which shows a vessel 70 with a vent 71 and an entrance 72. The vessel 70 contains a liquid 73 at a level $H_1$ above the vent 71, which is in fluid communication with a holding volume 74. The holding volume 74 is in fluid communication with the atmosphere through the opening 75 so that the air pressure therein remains at atmospheric. Additionally, the entrance 72 in the holding volume 74 is in liquid communication with the liquid 73 in the vessel 70.

Figure 7B:
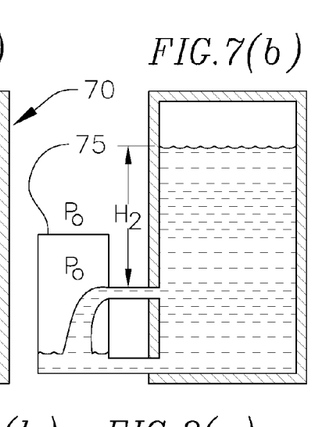

Initially, the pressure of the air 76 in the vessel 70 is atmospheric. Since the liquid 73 in the vessel 70 is at a level above the vent 71 and the entrance 72, the liquid pressures at those two locations are greater than atmospheric and liquid flows from the container 70 through the vent 71 and the entrance 72 into the holding volume 74 as illustrated in FIG. 7b.

Figure 7C:
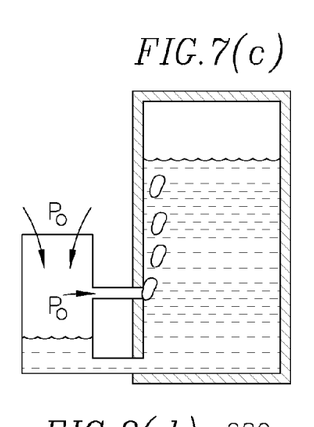

The liquid 73 continues to flow through the vent 71 until the pressure of the air 76 in the vessel 70 decreases from atmospheric by an amount equal to the product of the height of the liquid surface $H_2$ above the vent 71 and the liquid density. At this time, the pressure of the liquid at the vent 71 is equal to atmospheric pressure and the liquid stops flowing through vent 71 as illustrated in FIG. 7c. The pressure of the liquid 73 at the entrance 72 is greater than the pressure at the vent 71 by an amount equal to the density of the liquid times the vertical distance between the vent 71 and the entrance 72. As illustrated in FIG. 7c, liquid 73 continues to flow through entrance 72 since it is below the level of the vent 71.

Figure 7D:
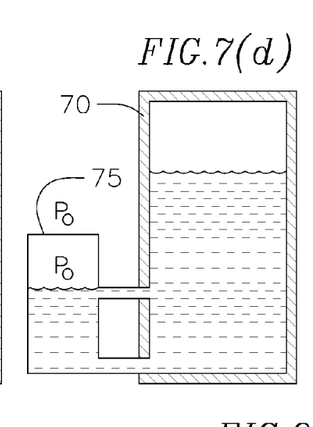

Simultaneously with the liquid flow through entrance 72, air from the holding volume 74 enters the vessel 70 through the vent 71. This flow of air results because the pressure in the vessel 70 tends to decrease as liquid flows out of the vessel 70 through the entrance 72. As long as the vessel 70 is sealed, except for the flow through the vent 71 and the entrance 72, the pressure in the vessel 70 remains constant during this period. Liquid continues to flow through the entrance 72 (since it is farther from the liquid level in the vessel than the vent 71) until the level of the liquid in the holding volume 74 reaches the vent 71. At this time, the liquid pressure in the holding volume 74 at the vent 71 location is equal to atmospheric and both the air and liquid flow stop. As illustrated in FIG. 7d, the holding volume 74 is full of liquid at the level of the vent 71. This is the measured volume to be dispensed.

The operation is summarized as follows. A holding volume 74 is immersed in the liquid in a closed container at atmospheric pressure. The liquid from the vessel 70 flows into the holding volume 74 through the vent 71 and entrance 72 due to pressure differences. As the liquid leaves the vessel 70 and enters the holding volume 74, the pressure in the vessel 70 decreases until the liquid pressure in the vessel 70 located at the vent 71 is equal to atmospheric pressure. The liquid flow through the vent 71 stops because of equal pressures and the flow continues through the entrance 72 due to pressure differences. The pressure in the vessel 70 tends to decrease due to the flow through the entrance 72 and causes air from the atmosphere to flow through the opening 75 to the holding volume 74 and through the vent 72 into the vessel 70 to maintain the pressure therein constant during this period. The flow of liquid through the entrance 72 into the holding volume 74 continues until the liquid level in the holding volume 74 reaches the vent 71. At this time both the airflow and the liquid flow stop because of equal pressure and a measured volume of liquid is available for discharge in the holding volume 74.

When the vessel 70 is inverted, liquid in the holding volume 74 is discharged through the opening 75, and the holding volume 74 is replaced with atmospheric air. When the vessel 70 is reoriented, the cycle then repeats.

FIGS. 8a-8d illustrates a liquid dispenser 180 including a regulator device 181 within a container 182. The regulator device 181 includes a tube 183 having an open end outside of the container 182 and a partially closed end proximate to the bottom of the container 182. The open end of the tube 183 communicates with the atmosphere and functions as both liquid discharge orifice and the air inlet orifice. When the container 182 is orientated upright, the regulator device 181 is covered with liquid. The tube 183 has a cavity 186, an entrance 185 located near the bottom of the container 182, and a vent orifice 184 displaced from the bottom of the regulator device 181. A measured volume is determined by the amount that the vent orifice 184 is displaced from the entrance 185.

Figures 8A, 8B, 8C:
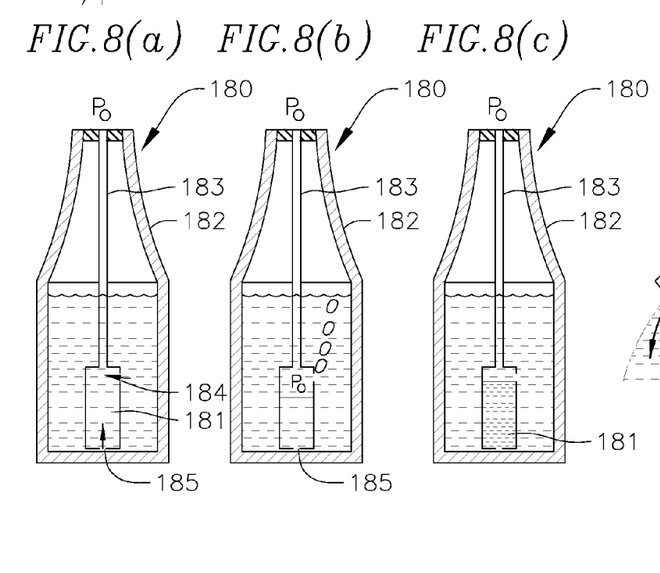
Figures 8D, 9:
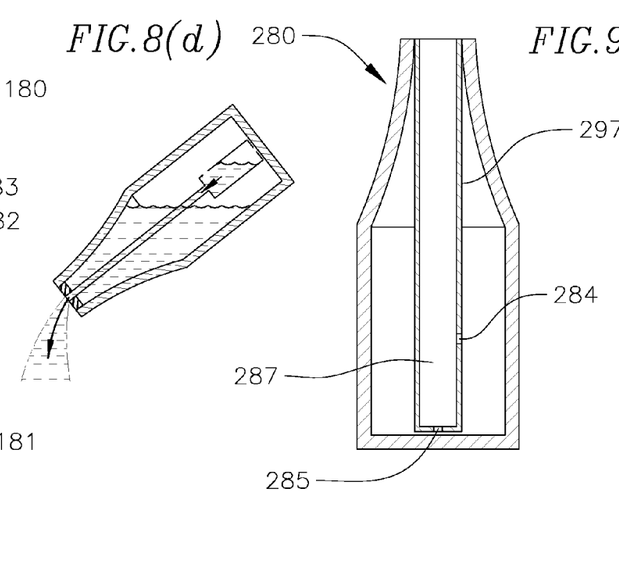
FIG. 9 is an illustration of a liquid dispenser according to an embodiment of the present invention.

When the container 182 is oriented upright, as illustrated in FIG. 8a, liquid flows from the container 182 through the vent orifice 184 and entrance 185 into the cavity 186 as a result of the pressure differences. As liquid flows into the tube cavity 186, the pressure in the closed container 182 is reduced until the pressure of the liquid in the container 182 at the vent 184 is equal to the atmospheric pressure (as illustrated in FIG. 8b). At that time, the flow of liquid through the vent orifice 184 stops because of the equal pressures of the liquid in the container 182 at the vent orifice 184 and the atmosphere (FIG. 8b). However, the pressure of the liquid at the entrance 185 is greater than atmospheric because of the added head of liquid. As liquid continues to flow through the entrance 185 into the tube cavity 186, the pressure in the container 182 continues to be reduced, causing atmospheric air in the tube 183 to flow into the tube cavity 186 and then through the vent orifice 184 into the container 182 to maintain the liquid pressure at the vent orifice 184 constant at a value of the atmospheric pressure. When the liquid in the tube cavity 186 reaches the vent orifice 184 there is no longer any driving pressure force so both the liquid and the airflow stop (FIG. 8c). This provides the measured volume of liquid for discharge.

When the container is inverted, as illustrated in FIG. 8d, the measured volume of liquid from the tube cavity 186 is discharged through the tube 183. The diameter of the tube 183 is large enough to allow atmospheric air to bubble into it during discharge of the liquid. The cycle repeats when the container 182 is oriented upright and atmospheric air enters the cavity 186 and container through the tube 183.

FIG. 9 illustrates a variation of the liquid dispenser 180 of FIG. 8. The liquid dispenser 280 of FIG. 9 has a tube 297 with a constant cross-section. An open end of the tube 297 functions as both fluid outlet and ambient inlet. A partially closed end of the tube 297 contains a fluid inlet 285. A measured volume of fluid is trapped between the fluid inlet 285 and an air transfer orifice 284. The tubes 183 and 297 of the liquid dispensers 180 and 280 could have a circular cross-section or some other cross-section.

Figure 10A:
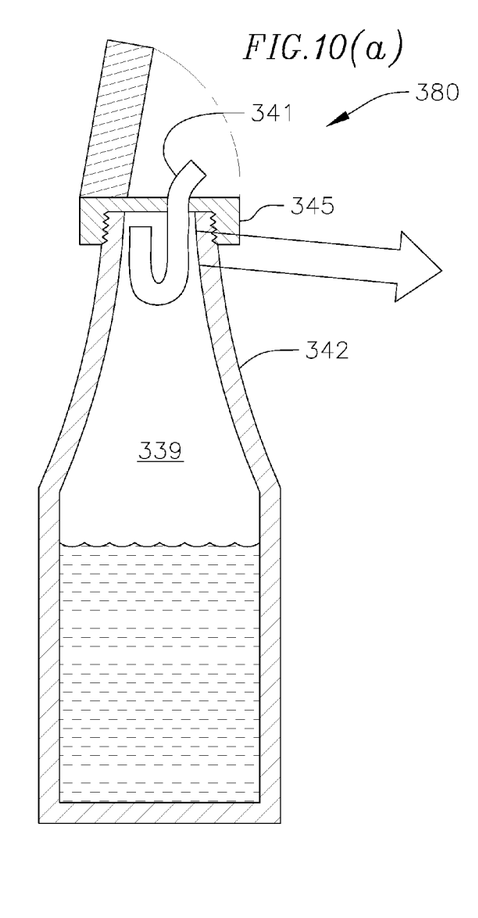
FIG. 10 is an illustration of a liquid dispenser according to an embodiment of the present invention.
Figure 10B:
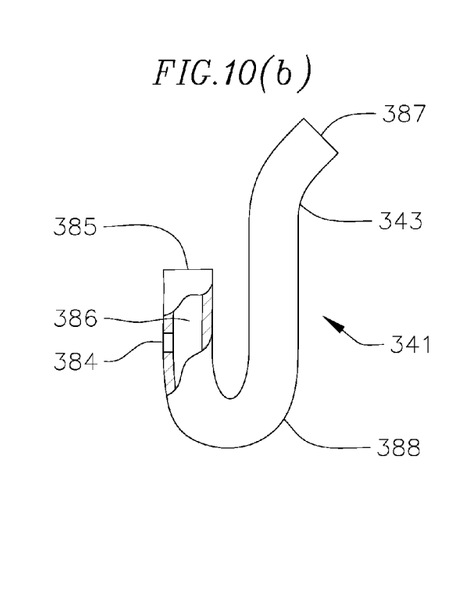

Reference is now made to FIGS. 10a-10b, which illustrate a liquid dispenser 380 including a container 342 having a cavity 339, a closure 345 for the container 342, and a regulator device 341 secured to the closure 345. The regulator device 341 includes a tube 343 having a first open end 387 outside the container 342 and a second open end 385 inside the container 342. The first open end 387 of the tube 343 functions as both ambient inlet and fluid outlet, and the second open end 385 functions as a fluid inlet. The tube 343 contains an air transfer orifice 384. The fluid inlet 387 and the air transfer orifice 384 define a first trap portion 386. A curved portion of the tube 343 between the air transfer orifice 384 and the first open end 387 defines a second trap portion 388.

The device 341 captures a volume in the first trap portion 386 between the air transfer orifice 384 and the fluid inlet 385 orifice. The first time that the liquid dispenser 380 is inverted, liquid flows from the container cavity 339 through the air transfer orifice 384 and entrance 385 into the first trap portion 386. When the liquid dispenser 380 is reoriented in an upright position, the trapped liquid is transferred to the second trap portion 388. The regulator device 341 is now primed. When the liquid dispenser 380 is inverted after the first time, the liquid from the first inversion that was in the second trap portion 386 is discharged at the open end 387 of the tube 343, as the new volume of fluid enters the cavity up to the air transfer orifice 384. Once the regulator device 341 has been primed, a measured volume of fluid can be discharged each time the liquid dispenser 380 is inverted.

The invention claimed is:

1. A fluid dispenser having a fluid outlet and an ambient inlet, the dispenser comprising:
    a container having a cavity; and
    a regulator device within the container cavity for regulating liquid flow out of the fluid outlet, the regulator device having a cavity in fluid communication with the ambient inlet, the regulator device having an air transfer orifice for placing the device cavity in fluid communication with the container cavity, the air transfer orifice spaced apart from the ambient inlet, the regulator device also having a fluid inlet, wherein location of the air transfer orifice with respect to the fluid inlet is such that flow of liquid from the container cavity into the device cavity stops when the liquid in the device cavity reaches the air transfer orifice, whereby the flow into the device cavity stops when pressure on both sides of the fluid inlet are equal.

2. The fluid dispenser of claim 1, wherein the fluid inlet is proximate to the fluid outlet, and wherein liquid flow out of the fluid outlet is stopped when liquid in the device cavity reaches the air transfer orifice, whereby dispensing time is regulated.

3. The fluid dispenser of claim 2, wherein container-side pressure at the fluid outlet during dispensing is a function of pressure at the air transfer passageway and fluid height between the fluid inlet and the air transfer orifice.

4. The apparatus of claim 2, further comprising a closure for the container, the regulator device carried by the closure.

5. The dispenser of claim 2, wherein the regulator device includes a base and sidewall that define the device cavity, the base opposing the closure, the air transfer orifice in the base, the fluid inlet in the sidewall.

6. The dispenser of claim 1, wherein the regulator device includes a tube having a first end outside of the container and a second end extending into the container, the first end of the tube being open and functioning as both the fluid outlet and the ambient inlet; and wherein the tube includes a trap portion for trapping liquid between the liquid inlet and the air transfer orifice; whereby dispensing volume is regulated.

7. The dispenser of claim 6, wherein the second end of the tube is partially closed and proximate to a base of the container, and wherein the fluid inlet and air transfer orifice are in the tube, with the air transfer orifice being between the fluid inlet and the open end of the tube.

8. The dispenser of claim 6, wherein the second end of the tube is also open and functions as the fluid inlet, wherein the tube has a second trap portion, and wherein the air transfer orifice is intermediate the fluid inlet and the second trap portion, wherein liquid is captured between the fluid inlet and the air transfer orifice when the dispenser is in a first orientation, and wherein the trapped liquid is transferred to the second trap portion when the dispenser is in a second orientation.

9. An article for a container of a liquid dispenser, comprising:
    a closure for the container; and
    a regulator device, carried by the closure, for regulating liquid flow out of a fluid outlet, the regulator having a cavity in fluid communication with an ambient inlet, the regulator device having an air transfer orifice for placing the device cavity in fluid communication with a cavity of the container, the air transfer orifice spaced apart from the ambient inlet, the regulator device also having a fluid inlet proximate to the fluid outlet, wherein location of the air transfer orifice with respect to the fluid inlet is such that flow of liquid from the container cavity into the device cavity stops when the liquid reaches the air transfer orifice.

10. An article for a container of a liquid dispenser, comprising:
    a closure for the container; and
    a regulator device, secured to the closure, for regulating liquid flow out of a fluid outlet, the regulator having a cavity in fluid communication with an ambient inlet, the regulator device including a tube having a first end outside of the container and a second end extending into the container, the first end being open and functioning as both the fluid outlet and the ambient inlet, the tube having an air transfer orifice and a fluid inlet for placing the device cavity in fluid communication with a cavity of the container, wherein the tube includes a trap portion between the fluid inlet and air transfer orifice for trapping liquid without a valve.

11. The article of claim 10, wherein the second end of the tube is partially closed, and wherein the fluid inlet and air transfer orifice are in the tube, with the air transfer orifice being between the fluid inlet and the open end of the tube.

12. The article of claim 10, wherein the second end of the tube is also open and functions as the fluid inlet, wherein the tube has a second trap portion, and wherein the air transfer orifice is intermediate the fluid inlet and the second trap portion, wherein liquid is captured between the fluid inlet and the air transfer orifice in a first orientation, and wherein the trapped liquid is transferred to the second trap portion in a second orientation.

13. The article of claim 10, wherein the tube has a fluid passage from the fluid inlet to the fluid outlet, and wherein the fluid passage is unobstructed.

14. The article of claim 10, wherein the fluid inlet and the air transfer orifice define the trap portion.

* * * * *